United States Patent [19]

Ishikawa

[11] Patent Number: 4,688,446
[45] Date of Patent: Aug. 25, 1987

[54] CONNECTING ROD MANUFACTURE

[75] Inventor: Yoichiro Ishikawa, Lombard, Ill.

[73] Assignee: Union Special Corporation, Chicago, Ill.

[21] Appl. No.: 939,380

[22] Filed: Dec. 8, 1986

Related U.S. Application Data

[63] Continuation of Ser. No. 707,928, Mar. 4, 1985, abandoned.

[51] Int. Cl.$^4$ .............. G05G 1/00; F02B 75/32; F16D 1/00; F16L 23/00
[52] U.S. Cl. .................. 74/579 E; 403/337; 123/137 AC; 29/156.5 A
[58] Field of Search ............ 74/579 R, 579 E, 579 F; 29/156.5 A; 123/90.39, 197 R, 197 AB, 197 AC; 403/337

[56] References Cited

U.S. PATENT DOCUMENTS

| | | |
|---|---|---|
| 273,382 | 3/1883 | Packham . |
| 401,586 | 4/1889 | Pollard . |
| 977,720 | 12/1910 | Ellis . |
| 989,676 | 4/1911 | Whitcomb . |
| 1,498,748 | 6/1924 | Pierce . |
| 1,631,916 | 6/1927 | Chambers . |
| 1,874,944 | 8/1932 | Fabian . |
| 2,145,864 | 2/1939 | Denneen et al. ............ 74/579 E |
| 2,311,434 | 2/1943 | Dusevoir ............ 74/579 E |
| 2,448,147 | 8/1948 | Jacobsen . |
| 2,553,935 | 5/1951 | Parks et al. ............ 74/579 E |
| 2,702,216 | 2/1955 | Stearns . |
| 2,879,092 | 3/1959 | Hargrove et al. ............ 403/337 |
| 2,995,953 | 8/1961 | Fazi ............ 74/579 E |
| 3,431,796 | 3/1969 | Valbjorn ............ 74/579 E |
| 3,751,080 | 8/1973 | Bailey et al. ............ 74/579 E |
| 3,790,236 | 2/1974 | Pierce ............ 74/579 E |
| 3,818,577 | 6/1974 | Bailey et al. ............ 74/579 E |
| 3,981,229 | 9/1976 | Breisch et al. ............ 74/579 E |
| 4,053,248 | 10/1977 | Schultenkamper ............ 403/337 |
| 4,191,487 | 3/1980 | Schultenkamper ............ 403/337 |
| 4,207,779 | 6/1980 | Papst ............ 74/579 E |
| 4,357,913 | 11/1982 | Hori et al. . |
| 4,372,179 | 2/1983 | Dolenc et al. ............ 74/579 E |

FOREIGN PATENT DOCUMENTS

| | | | |
|---|---|---|---|
| 513828 | 6/1955 | Canada ............ 74/579 E |
| 864172 | 1/1953 | Fed. Rep. of Germany .... 74/579 E |
| 1130229 | 5/1962 | Fed. Rep. of Germany .... 74/579 E |
| 1131462 | 6/1962 | Fed. Rep. of Germany .... 74/579 E |
| 1020001 | 1/1953 | France ............ 74/579 E |
| 47-23243 | 6/1972 | Japan ............ 74/579 E |
| 299872 | 9/1929 | United Kingdom ............ 74/579 E |
| 669105 | 6/1979 | U.S.S.R. ............ 74/579 E |

Primary Examiner—Gary L. Smith
Assistant Examiner—Vinh Luong
Attorney, Agent, or Firm—Powell L. Sprunger

[57] ABSTRACT

A connecting rod or similar machine component comprising an assembly of two seperable parts having a spherical or cylindrical bearing surface provided therebetween. The parts comprising the assembly are manufactured from a ductile material, i.e., brass, aluminum or any alloy thereof. The two seperable parts are aligned by providing the confronting surfaces of the respective parts' first and second sides with intermeshing serrations extending in generally linearly, angularly disposed paths. When the parts are assembled, the intermeshing serrations on the parts' first side coact with the serrations on the parts' other side to create a wedging relationship therebetween whereby preventing lateral and lengthwise displacement of the bearing parts relative to each other.

1 Claim, 5 Drawing Figures

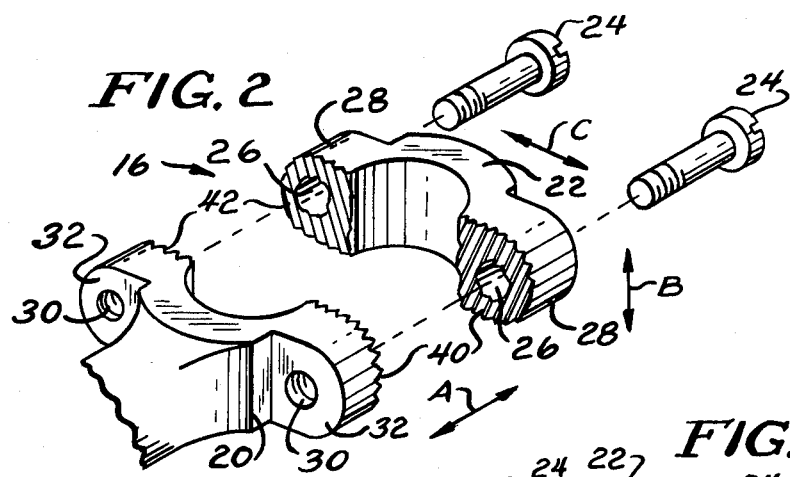
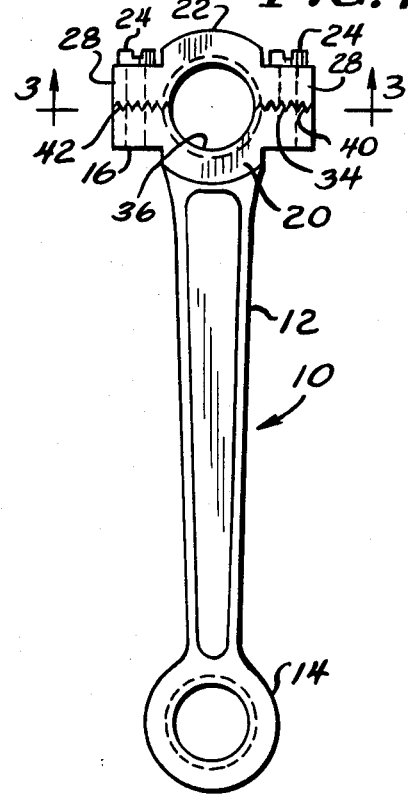
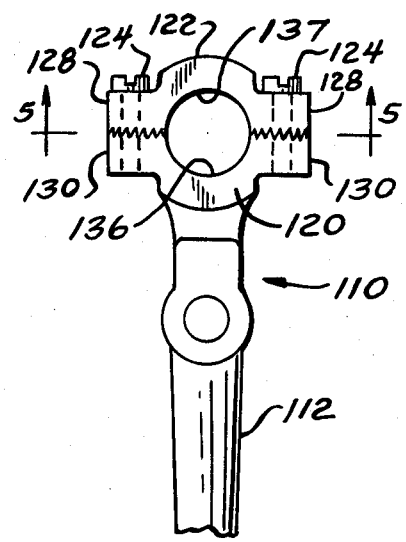
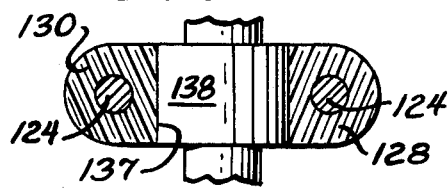
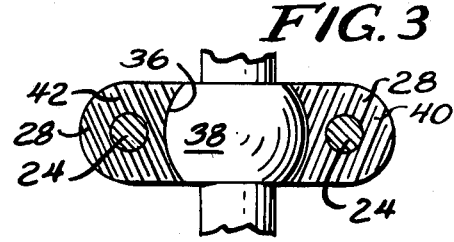

CONNECTING ROD MANUFACTURE

This is a continuation of application Ser. No. 707,928, filed Mar. 4, 1985 now abandoned.

FIELD OF THE INVENTION

The present invention generally relates to connecting rods and, more particularly, to improvements in the construction of connecting rods having a seperable cap or two piece head assembly.

BACKGROUND OF THE INVENTION

Two piece connecting rods comprised of a bearing segment or part and a seperable cap, are well known. Such connecting rods are commonly used in a link train for translating rotational motion into reciprocatory motion. Often times, the rotational motion is ultimately translated into three dimensional spatial motion. In such applications, the connecting rod joints or bearing surfaces are required to be spherical. Unless the smooth internal or bearing surface of the spherical bore matches perfectly at the location where the cap is joined to the other bearing part and the joining surfaces of the cap and bearing part along the plane of seperation likewise match perfectly, the assembly is likely to lock up or bind.

Prior to this invention, a great number of approaches have been used for aligning seperable members. With connecting rods made of high carbon steels or other fracturable materials, the cap portion is usually fractured across a weakened zone thereby creating surface irregularities which serve to fit one part to the other. When dealing, as in the present invention, however, with ductile or malleable materials, i.e. brass, aluminum, or alloys thereof, the material will not crack or fracture across a weakened zone. Instead, such malleable material will likely bend whereby creating other manufacturing problems.

For ductile or malleable materials, a splined stud has been alternatively suggested as a means for maintaining the proper relationship between the seperable cap and other bearing segment. This design, however, requires impressing the studs' splines into the soft material of the connecting rod. Such action, of course, results in some material chips or particles being displaced. The cleaning of such extruded materials becomes an additional and thus costly procedure. The cleaning of such extruded material is critical since if those displaced material particles become trapped between the connecting rod and the cap, secure clamping between those parts cannot be obtained. Thus, improper oil clearances may result. As a skilled artesian can appreciate, the use of splined studs usually requires a size increase of the diametrically opposed and outwardly extending ears or flanges to accommodate the splined stud.

Serrated connecting rod interfaces have also been used before. In such applications, the serrations are disposed in a parallel relationship to the axis to the journal. On a cylindrical journal, as long as the cap is coaxially or laterally aligned with the journal, an adequate bearing surface may be provided. A proper oil clearance may also be achieved despite the lateral misalignment of the two bearing segments or parts. As mentioned above, however, on a spherical bearing surface, both lateral and lengthwise alignment between the cap and the other bearing segment must be maintained. The assembly or reassembly of the bearing parts without achieving both lateral and lengthwise alignment thereof may result in a misaligned bearing surface and/or inaccurate oil clearances. Such misalignment of the bearing surface may ultimately result in heat build up and may possibly cause machine seizure.

BRIEF DESCRIPTION OF THE PREFERRED EMBODIMENT

Because of the above, and in accordance with the present invention, there is provided a unique two piece connecting rod or like machine component of ductile material which is provided with means for achieving both lateral and lengthwise alignment between the cap and the other bearing segment every time the parts are seperated and reassembled. The two seperable parts are aligned by providing the confronting surfaces of the respective parts' first and second sides with intermeshing complementary serrations which are angularly disposed relative to the axis of the spherical bore and to each other. By such construction, and when joined, the serrations on each side of the journal wedges against the other to prevent both lateral and lengthwise shifting or displacement of the bearing parts relative to each other. As such, the smooth internal or bearing surface of the spherical bore matches perfectly at the location where the cap is joined to the other bearing part and the joining surfaces of the cap and bearing part along the plane of seperation will likewise perfectly match whereby additionally assuring the provision of accurate oil clearances during machine operation.

In accordance with the above, a primary object of this invention is to provide a two piece connecting rod or the like having an improved structure for facilitating alignment and assembly of the seperable bearing parts.

Another object of this invention is to provide a two piece connecting rod having an improvement to the parts and the joint thereof to provide for a perfect subsequent fit and proper matching and alignment of parts.

Another object of this invention is the provision of a two piece machine component provided with a spherical journal wherein the cap can be repeatedly assembled in a proper orientation relative to the other bearing part in only one way.

Yet another object of this invention is the provision of a two piece connecting rod which utilizes common fasteners for connecting the cap to the bearing part and which includes means for preventing the cap from moving or shifting when the fastening screws are tightened.

A still further object of this invention is the provision of a two piece connecting rod of such construction whereby the seperable cap and bearing segment are formed with wedging interlocking members which faciliate the alignment and assembly of the seperable members.

Another object of this invention is to provide a two piece connecting rod assembly wherein the diametrically opposed outwardly projecting flanges or ears provided on the bearing segment or cap for securing the parts together may be sized to accommodate regular fastener screws.

It is another object of this invention to provide a two piece connecting rod assembly which can be readily fabricated at economically feasible costs by relatively inexpensive metal working procedures.

BRIEF DESCRIPTION OF THE DRAWINGS

Having in mind the above objects and other attendent advantages that would be evident from an understanding of this disclosure, the invention comprises the devices, combinations and arrangement of parts as illustrated in the disclosed embodiments of the invention which are hereinafter set forth in detail to enable those skilled in the art to readily understand the function, operation, construction, and advantages of the invention when read in conjunction with the accompanying drawings in which:

FIG. 1 is a schematic end view of a spherical bearing embodiment connecting rod embracing the features of the present invention;

FIG. 2 is a partial perspective view of two seperable parts of a cylindrical bearing embodiment comprising the end head and which are designed in accordance with the spirit of the present invention;

FIG. 3 is an enlarged plan view taken along line 3—3 of FIG. 1;

FIG. 4 is a cylindrical bearings embodiment of a machine component embracing the spirit of the present invention; and FIG. 5 is an enlarged plan view taken along line 5—5 of FIG. 4.

DETAILED DESCRIPTION OF THE PRESENT INVENTION

The invention has been shown and described herein as especially applicable to a connecting rod manufactured from a ductile material, i.e. brass, aluminum or alloys thereof and wherein the crank end or head is made in two seperable component parts. A skilled artesian, however, will quickly and readily appreciate the spirit of this invention is equally applicable to produce machine component assemblies of different types which utilizes seperable caps at one or both ends.

Referring now to FIGS. 1 through 3 of the drawings, wherein like reference numerals indicate like parts throughout the views, there is schematically illustrated a connecting rod 10 the entirety of which may be cast, machined, or otherwise formed from ductile materials, i.e. brass, aluminum or alloys thereof. The connecting rod 10 comprises, in general, a shank or body portion 12, a wrist pin boss 14 having a suitably formed aperture provided at one end of the body portion and a crank pin boss or head portion 16 provided at the opposite end. The head portion 16 includes at least two seperable parts; namely, a first bearing part 20 and a second bearing part or cap 22. The cap 22 may be removably secured to the bearing portion 20 by means of cap screws 24 or the like. As best seen in FIG. 2, the fasteners 24 are received in apertures 26 provided in outwardly projecting bearing lugs or flanges 28 of the cap portion 22 and suitable threaded apertures 30 provided in diametrically opposed flanges or ears 32 provided on the bearing segment 20. The meeting faces of the bearing lugs define a parting line or plane 34 (FIG. 1) along which the cap 22 is detachable from the bearing part 20 by relative movement in the general direction of Arrow A (FIG. 2). Additionally, a bore 36 is provided in the head portion 16 with its center line extending sideways through the bearing segment along a given axis which extends generally perpendicular to the general direction along which the parts are seperable. The center line of the bore preferably lies approximately on the desired parting line or plane 34. After the bearing segments are drawn together, the bore 36 may be subsequently machined to provide an arcuate surface or spherical journal for a suitable formed crank pin 38 (FIG. 3).

In accordance with the particularly salient aspects of the invention, the present invention provides unique means for achieving and maintaining alignment between the two bearing segments comprising the head portion of the machine component. To accomplish this end, two independent sets of alignment means 40 and 42, provided on the confronting faces of the seperable parts or members, serve to consistently align the cap 22 with the bearing part 20. Each set of alignment means includes a series of complementary serration provided on the coupling face and counter coupling face of the bearing lugs 28 and 32. That is, each alignment means provided on the meeting faces of the lugs includes one or more intermeshing cooperable components. The intermeshing components include a plurality of substantially parallel serrations on one bearing lug which match with corresponding serrations provided on the other bearing lug. The complementary serrations forming the first alignment means are angularly disposed with respect to the given aspect of the bore means 26. Likewise the complementary serrations forming the second alignment means are angularly disposed with respect to the given axis of the bore means 36 and are arranged at an intersecting angle with respect to the extended direction of the serrations comprising the first alignment means. Preferably, the angle extending between the directions of the first alignment means and the direction of the second alignment means is 90 degrees or less.

In a second embodiment, illustrated in FIGS. 4 and 5, there is provided a machine component 110 which, at one end, is articulately connected to an arm 112. Like the connecting rod of the first embodiment, the machine component 110 includes a first bearing segment 120 and a cap portion 122. The cap portion 122 may be releasably secured to the bearing segment 120 by fasteners 124. The bearing segment 120 is provided with a semi cylindrical bearing surface 136. The other bearing segment or cap is also provided with a semi cylindrical bearing surface 137 corresponding to the surface 136. When joined, the seperable parts form a cylindrical aperture capable of accomodating a crank pin 138 (FIG. 5). As with the connecting rod of the first embodiment, the bearing segments or parts of the machhine component each include opppositely extended flanges 128 and 130 disposed on opposite sides of the crank pin 138. It is through these flanges that the fasteners 124 extend in a manner releasably securing the parts together. To assure the precise alignment of the parts, the meeting faces of the flanges or lugs 128 and 130 are provided with alignment means substantially similar to those described above. That is, the respective coupling surfaces and counter coupling surfaces of each alignment means are provided with a series of complementary serrations which serve to align the parts when they are brought together in the same manner discussed with respect to the first embodiment.

The advantages of the structure as described above with respect to FIGS. 1 through 5 is that the complementary serrations on the flanges can be easily fabricated by reaming or milling operations. All the serrations extending in one direction may be formed by single operating pass which thus avoids misalignment problems.

As well be readily appreciated, the connecting rod is assembled by bringing the cap 22 into engagement with the bearing segment 20. Because one set of serrations are disposed at an opposed angle to the serrations on the other set, such structure prevents inadvertent reversal of the seperable members during assembly. Moreover, the conflicting angular disposition of the serrations is such to create a working relationship between the alignment means in a manner securing the cap portion 22 against both lateral (in the direction of Arrow B in FIG. 2) and lengthwise (in the direction of Arrow C in FIG. 2) displacement relative to the bearing part 20. When the two seperable parts are placed together, the surface irregularities of one part exactly fit the surface irregularities of the other part. As a consequence of the wedging relationship created between the alignment means, there is no movement or shifting between the parts—provided the two parts are firmly held together as by fasteners 24. The fact that the two parts perfectly mate with one another is important since it prevents any binding effect of the crank pin in the spherical journal.

Thus there has been provided a crank pin or like machine components which fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Having thus adequately described my invention, what I claim is:

1. A machine component comprising:
   a first bearing part with an inner spherical bearing surface adapted for engagement with a crankpin;
   a second bearing part adapted for engagement with said crankpin and continuing with said first bearing surface to define a spherical bearing surface;
   at least two bearing lug sets projecting from said bearing parts, with each set of bearing lugs including a coupling surface engagable with a counter coupling surface and there being an opening in said lugs to receive detachable fastener elements for rigidly but detachable securing the bearing parts together and wherein the coupling surfaces of each set of lugs being provided with a series of angularly disposed complementary serrations, with all of the serrations of one bearing lug being straight, parallel and angularly disposed relative to the serrations of the other bearing lug set being straight, parallel to prevent lateral and lengthwise displacement of said bearing parts relative to each other.

* * * * *